US012798472B2

(12) United States Patent
Heo

(10) Patent No.: US 12,798,472 B2
(45) Date of Patent: Nov. 17, 2026

(54) LAMP CONTROL SYSTEM, LAMP CONTROL METHOD, AND VEHICLE

(71) Applicant: HYUNDAI MOBIS CO., LTD., Seoul (KR)

(72) Inventor: Yun Ji Heo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/906,997

(22) Filed: Oct. 4, 2024

(65) Prior Publication Data

US 2025/0303956 A1 Oct. 2, 2025

(30) Foreign Application Priority Data

Mar. 26, 2024 (KR) ........................ 10-2024-0040864

(51) Int. Cl.
*B60Q 1/14* (2006.01)

(52) U.S. Cl.
CPC ........ *B60Q 1/1423* (2013.01); *B60Q 2300/20* (2013.01); *B60Q 2300/23* (2013.01); *B60Q 2300/335* (2013.01)

(58) Field of Classification Search
CPC .............. B60Q 1/1423; B60Q 2300/20; B60Q 2300/23; B60Q 2300/335; B60Q 2300/054; B60Q 2300/33; B60Q 1/085; B60Q 1/143; B60Q 2300/45; B60Q 2800/10; B60Q 2300/331; B60Q 2300/40
See application file for complete search history.

(56) References Cited

U.S. PATENT DOCUMENTS

2024/0017662 A1* 1/2024 Kuramochi ............ B60Q 1/085
2024/0326805 A1* 10/2024 Ishikawa ............. B60W 30/146
2024/0383474 A1* 11/2024 Yoon ...................... B60W 30/12
2025/0178518 A1* 6/2025 Sung ....................... B60Q 1/143
2025/0368235 A1* 12/2025 Buerkle ............ B60W 60/0051

* cited by examiner

*Primary Examiner* — Christopher E Dunay
(74) *Attorney, Agent, or Firm* — NovoTechIP International PLLC

(57) ABSTRACT

A lamp control system includes a pair of lamps configured to emit light forward; a sensing module configured to sense an adjacent lane of a travelling vehicle; and a processor configured to: receive information on the sensed adjacent lane; and when the adjacent lane corresponds to a specific lane, control a light output of a lamp adjacent to the specific lane among the pair of lamps based on the received information on the adjacent lane. The specific lane may include at least one of a center line and an outermost lane.

12 Claims, 8 Drawing Sheets

FIG. 5

| Linked Information | Acceleration ML | Distance ML | Reaction ML | Overall Indicator | Overall Tendency | Operating Conditions |
|---|---|---|---|---|---|---|
| Caution 3<br>Normal 2<br>Safety 1 | Strong | Short | Slow | 9 (MAX) | Cautious Driver | Early |
| | | | Normal | 8 | | |
| | | Normal | Slow | 8 | | |
| | Normal | Short | Slow | 8 | | |
| Value | | ⋮ | ⋮ | 7~5 | Normal Driver | Medium |
| | | Long | Fast | 4 | Safety-Conscious Driver | Late |
| | Weak | Normal | Fast | 4 | | |
| | | Long | Normal | 4 | | |
| | | | Fast | 3 (MIN) | | |

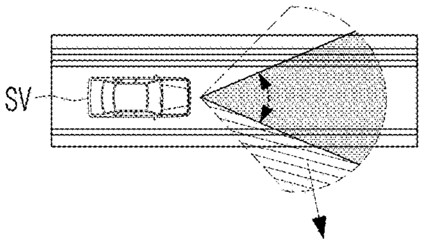

| Linked Information | Personalized Data Linkage | | |
|---|---|---|---|
| Tendency | Cautious | Normal | Safety-Conscious |
| Light Output Level | 70% | 50% | 30% |

| Linked Information | Reaction ML | | |
|---|---|---|---|
| Tendency | Strong | Normal | Weak |
| Operating Conditions | Below 80 km/h | Below 70 km/h | Below 65 km/h |
| Operating Time | Restore at 300 m | Restore at 400 m | Restore at 450 m |

| Linked Information | Reaction ML | | |
|---|---|---|---|
| Tendency | Strong | Normal | Weak |
| Operating Conditions | Focusing for more than 0.2 seconds<br>Focusing more than 3 times | Focusing for more than 0.4 seconds<br>Focusing more than 2 times | Focusing for more than 0.5 seconds<br>Focusing more than 2 times |

LAMP CONTROL SYSTEM, LAMP CONTROL METHOD, AND VEHICLE

CROSS-REFERENCE TO RELATED APPLICATIONS

This application claims the benefit of Korean Patent Application No. 10-2024-0040864, filed on Mar. 26, 2024, which is hereby incorporated by reference as if fully set forth herein.

TECHNICAL FIELD

Embodiments are applicable to vehicles in all fields and, more particularly, relate to a lamp control system, a lamp control method, and a vehicle that control the light output of lamps.

BACKGROUND

As the use of light emitting diode (LED) light sources in vehicle lamps continues to increase, various high beam and low beam vehicle lamp modules are on the rise. In particular, the trend of integrating high-low beam vehicle modules is becoming prominent. Such modules are well-received in the market due to the low cost, compact size, simple structure, and comprehensive functionality.

As the interest in safety during vehicle driving increases, a significant number of driving accidents occur each year due to the improper use of high beams. Vehicle lamp modules with adaptive driving beam (ADB) functionality may somewhat resolve contradictions in the use of high-low beams. Specifically, the vehicle lamp modules with ADB functionality may provide excellent visibility to vehicles and thus preventing glare for other drivers. The ADB function includes a smart control capability. That is, the ADB function may independently control each LED, thereby allowing for real-time control of the lighting area and brightness and effectively preventing glare for other vehicles and pedestrians.

Conventional vehicles with ADB functionality have been used in a way where the driver directly specifies a speed at which the ADB function is activated and the ADB function automatically activates when the vehicle is driving above the corresponding speed. However, the conventional method controls the lighting without considering the environment of a road where the vehicle is driving. This results in issues where the lighting becomes dimmer on relatively dark roads or brighter in relatively bright areas, hindering the visibility of pedestrians and other drivers. In addition, the ADB function may activate earlier than the driver desires, leading to numerous malfunctions due to camera recognition errors, or the ADB function may activate later than the driver desires, causing frustration for the driver.

Further, even when the ADB function is installed in the vehicle, it is common for the driver to be unaware of the installation of the ADB function and thus not use the ADB function. Therefore, there is a need for a method capable of automatically activating the ADB function according to the surrounding road environment and the preferences of the driver.

SUMMARY

Accordingly, the present disclosure is directed to a lamp control system, lamp control method, and vehicle that substantially obviate one or more problems due to limitations and disadvantages of the related art.

The present disclosure aims to solve the aforementioned problems. According to embodiments, the present disclosure aims to control a lamp to decrease the light output of the lamp for unnecessary outer lane areas.

According to embodiments, the present disclosure aims to control a lamp to restore the light output of the lamp for outer lane areas when necessary.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, provided herein is a lamp control system according to embodiments. The lamp control system includes: a pair of lamps configured to emit light forward; a sensing module configured to sense an adjacent lane of a travelling vehicle; and a processor configured to: receive information on the sensed adjacent lane; and in response to the adjacent lane corresponding to a specific lane, control a light output of a lamp adjacent to the specific lane among the pair of lamps based on the received information on the adjacent lane. The specific lane may include at least one of a center line and an outermost lane.

According to the embodiments, the processor may be configured to: in response to the specific lane corresponding to the center line, turn off a light output of a lamp adjacent to the center line or control the light output of the lamp adjacent to the center line to have a first light output; and in response to the specific lane corresponding to the outermost lane, control a light output of a lamp adjacent to the outermost lane to have a second light output.

According to the embodiments, the first light output may have a value smaller than the second light output.

According to the embodiments, in response to the specific lane corresponding to the outermost lane, the processor may be configured to: analyze a driving tendency or tendencies of a driver; and control a light output of a lamp adjacent to the outermost lane based on the driving tendency or tendencies of the driver.

According to the embodiments, the processor may be configured to analyze the driving tendency or tendencies of the driver based on at least one of information on an acceleration tendency or tendencies of the driver, information on a safe distance tendency or tendencies of the driver, and information on a reaction speed tendency or tendencies of the driver.

According to the embodiments, the sensing module may be configured to detect at least one of static and dynamic objects around the vehicle. In response to the specific lane corresponding to the outermost lane and that information on at least one of a static or dynamic object outside the outermost lane is received, the processor may be configured to restore a light output of a lamp adjacent to the outermost lane for a predetermined period of time.

According to the embodiments, the processor may be configured to: configure operating conditions based on information on a reaction speed tendency or tendencies of a driver; configure a recovery point based on the operating conditions; and restore the light output of the lamp adjacent to the outermost lane at the recovery point in response to the operating conditions are satisfied for each driver.

According to the embodiments, the sensing module may be configured to detect a pupil movement of a driver. In response to the specific lane corresponding to the outermost lane, the processor may be configured to: receive information on the detected pupil movement of the driver; and restore a light output of a lamp adjacent to the outermost lane for a predetermined period of time based on the received information on the pupil movement.

According to the embodiments, the processor may be configured to: configure operating conditions based on information on a reaction speed tendency or tendencies of a driver; and restore the light output of the lamp adjacent to the outermost lane in response to the information on the pupil movement satisfies the operating conditions for each driver.

According to the embodiments, the information on the pupil movement may include at least one of information on a time at which pupils of the driver are focused on the outermost lane and information on a number of times the pupils of the driver are focused on the outermost lane.

According to the embodiments, the information on the adjacent lane may include at least one of information on a number of lanes, information on types of lanes, and information on colors of lanes.

According to the embodiments, the pair of lamps may include a pair of high beams. The processor may be configured to control a beam pattern of a high beam adjacent to the specific lane among the pair of high beams.

In embodiments, provided herein is a lamp control method for controlling light outputs of a pair of lamps emitting light forward. The lamp control method includes: sensing an adjacent lane of a travelling vehicle; receiving information on the sensed adjacent lane; and in response to the adjacent lane corresponding to a specific lane, controlling a light output of a lamp adjacent to the specific lane among the pair of lamps based on the received information on the adjacent lane. The specific lane may include at least one of a center line and an outermost lane.

According to the embodiments, the controlling may include: in response to the specific lane corresponding to the center line, turning off a light output of a lamp adjacent to the center line or controlling the light output of the lamp adjacent to the center line to have a first light output; and in response to the specific lane corresponding to the outermost lane, controlling a light output of a lamp adjacent to the outermost lane to have a second light output.

In embodiments, provided herein is a vehicle. The vehicle includes: a pair of lamps configured to emit light forward; a sensing module configured to sense an adjacent lane while travelling; and a processor configured to: receive information on the sensed adjacent lane; and in response to the adjacent lane corresponds to a specific lane, control a light output of a lamp adjacent to the specific lane among the pair of lamps based on the received information on the adjacent lane. The specific lane may include at least one of a center line and an outermost lane.

According to embodiments, the light output of a lamp may be reduced for unnecessary outer lane areas, thereby providing an optimal beam pattern for the lamp that reduces power consumption without diminishing visibility.

According to embodiments, the light output of a lamp may be restored for outer lane areas if necessary, thereby restoring the light output in the area of interest of a driver.

The effects obtainable from the present disclosure are not limited to those mentioned above. Other effects not mentioned may also be clearly understood by those skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 5 to 7 illustrate lamp control of a vehicle according to additional embodiments.

DETAILED DESCRIPTION

Hereinafter, preferred embodiments of the present disclosure will be described in detail, examples of which are shown in the attached drawings. The detailed description below with reference to the attached drawings is intended to explain the preferred embodiments of the present disclosure, rather than representing only embodiments capable of being implemented according to the present disclosure. The following detailed explanation includes specific details to provide a thorough understanding of the embodiments. However, it is evident to those skilled in the art that the embodiments are capable of being practiced without these specific details.

Most of the terms used herein are selected from commonly used terms in the relevant field. However, some terms are arbitrarily chosen by the applicant, and the meanings thereof are detailed in the following description as needed. Therefore, the embodiments should be understood based on the intended meaning of the terms rather than the names or meanings thereof.

Figure 1:
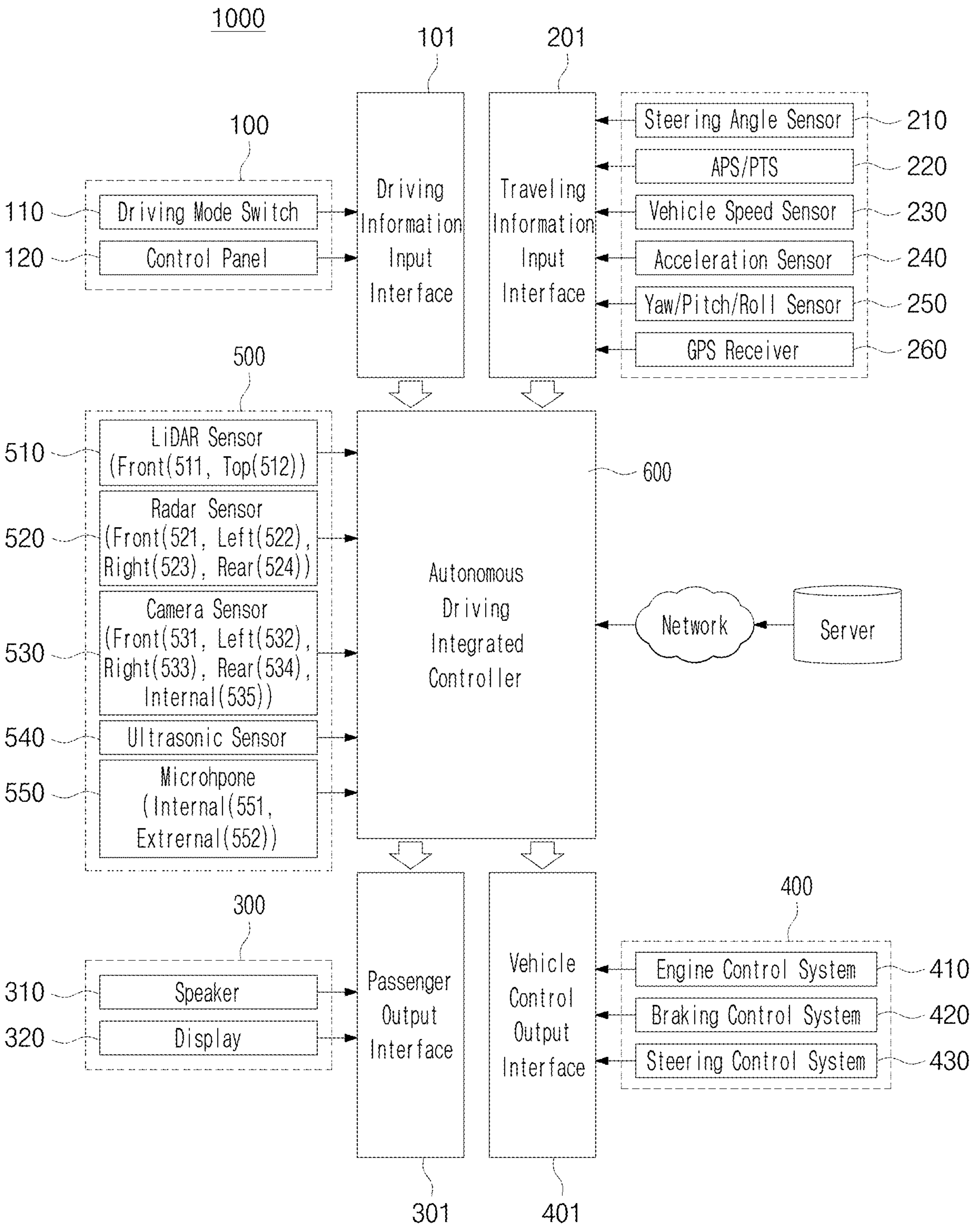
FIG. 1 is a block diagram of a vehicle system according to embodiments.
Figure 2:
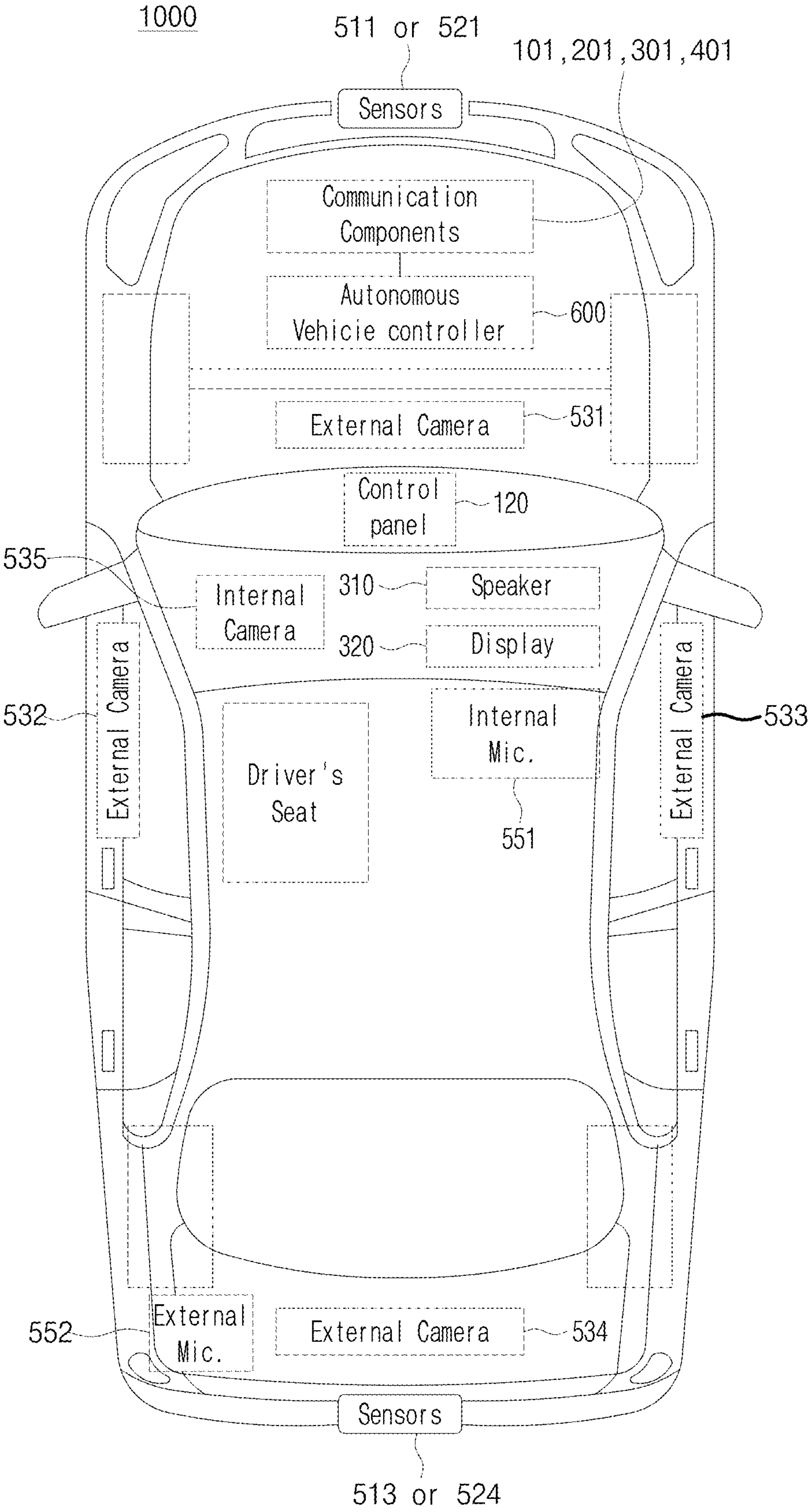
FIG. 2 is an illustrative diagram showing the structure of a vehicle according to embodiments.

FIG. 1 is a block diagram of a vehicle system according to embodiments. FIG. 2 is an illustrative diagram showing the structure of a vehicle according to embodiments.

FIG. 2 shows a vehicle having applied the vehicle system of FIG. 1.

The vehicle according to the embodiments may be configured as shown in FIG. 2 and can perform autonomous driving based on an autonomous driving control system. The vehicle according to the embodiments may be referred to as an autonomous vehicle, a robot, an urban air mobility (UAM), an autonomous driving apparatus, etc.

An autonomous vehicle 1000 may be implemented based on an autonomous driving integrated controller 600, which transmits and receives data necessary for autonomous driving control through a driving information input interface 101, a travelling information input interface 201, an occupant output interface 301, and an autonomous vehicle control output interface 401. However, in this specification, the autonomous driving integrated controller 600 may also be referred to as a processor, processors, or simply as a controller.

The autonomous driving integrated controller 600 may acquire, through the driving information input interface 101, driving information based on the operations of an occupant on the user input unit 100 in the autonomous driving mode or manual driving mode of the autonomous vehicle. As shown in FIG. 1, the user input unit 100 may include a driving mode switch 110 and a control panel 120 (e.g., a navigation device installed in the autonomous vehicle, a smartphone or tablet PC carried by the occupant, etc.). Accordingly, the driving information may include driving mode information and navigation information on the autonomous vehicle.

For example, the driving mode (i.e., autonomous driving mode/manual driving mode or sports mode/eco mode/safe mode/normal mode) of the autonomous vehicle, which is determined by the operation of the driving mode switch 110 by the occupant, may be transmitted to the autonomous driving integrated controller 600 through the driving information input interface 101 as the above-described driving information.

Navigation information such as an occupant destination and a route to the destination (e.g., the shortest route or preferred route selected by the occupant among candidate routes to the destination), which is input by the occupant through the control panel 120, may be transmitted to the autonomous driving integrated controller 600 through the driving information input interface 101 as the above-described driving information The control panel 120 may be implemented as a touch screen panel providing a user interface (UI) for the occupant to input or modify information for autonomous driving control of the autonomous vehicle. In this case, the aforementioned driving mode switch 110 may be implemented as a touch button on the control panel 120.

In addition, the autonomous driving integrated controller 600 may obtain travelling information indicating the driving state of the autonomous vehicle through the travelling information input interface 201. The travelling information may include various information indicating the driving states and behaviors of the autonomous vehicle, such as a steering angle formed when the occupant manipulates a steering wheel, an accelerator pedal stroke or brake pedal stroke formed when the occupant depresses an accelerator pedal or brake pedal, and behaviors of the vehicle including a vehicle speed, acceleration, a yaw, a pitch, and a roll formed in the vehicle. As shown in FIG. 1, each piece of the travelling information may be detected by the driving controller 200, which includes a steering angle sensor 210, an accelerator position sensor/pedal travel sensor (APS/PTS) 220, a vehicle speed sensor 230, an acceleration sensor 240, and a yaw/pitch/roll sensor 250.

The travelling information on the autonomous vehicle may also include information on the location of the vehicle, which may be obtained through a global positioning system (GPS) receiver 260 applied to the autonomous vehicle. The travelling information may be transmitted to the autonomous driving integrated controller 600 through the travelling information input interface 201 and then used to control the driving of the autonomous vehicle in the autonomous driving mode or manual driving mode.

The autonomous driving integrated controller 600 may transmit information on the driving state of the autonomous vehicle in the autonomous driving mode or manual driving mode, which is intended for the occupant, to an output unit 300 through the occupant output interface 301. In other words, the autonomous driving integrated controller 600 may transmit the information on the driving state of the autonomous vehicle to the output unit 300, enabling the occupant to check the autonomous or manual driving state of the vehicle based on the driving state information displayed through the output unit 300. The driving state information may include various information indicating the driving state of the autonomous vehicle, such as the current driving mode, gear range, vehicle speed, and so on.

If the autonomous driving integrated controller 600 determines that a warning is necessary for the occupant in the autonomous driving mode or manual driving mode, the autonomous driving integrated controller 600 may transmit warning information along with the aforementioned driving state information to the output unit 300 through the occupant output interface 301 to enable the output unit 300 to issue the warning to the occupant. To output the driving state information and warning information both audibly and visually, the output unit 300 may include a speaker 310 and a display device 320 as shown in FIG. 1. In this case, the display device 320 may be implemented as the same device as the aforementioned control panel 120 or as a separate and independent device.

The autonomous driving integrated controller 600 may transmit control information for driving control of the autonomous vehicle in the autonomous driving mode or manual driving mode to a lower control system 400 applied to the autonomous vehicle through the autonomous vehicle control output interface 401. As shown in FIG. 1, the lower control system 400 for driving control of the autonomous vehicle may include an engine control system 410, a braking control system 420, and a steering control system 430. The autonomous driving integrated controller 600 may transmit engine control information, braking control information, and steering control information as the control information to each lower control system 410, 420, and 430 through the autonomous vehicle control output interface 401. Accordingly, the engine control system 410 may control the vehicle speed and acceleration of the autonomous vehicle by increasing or decreasing the fuel supplied to the engine. The braking control system 420 may control the braking of the autonomous vehicle by adjusting the braking force. The steering control system 430 may control the steering of the autonomous vehicle through a steering device applied to the vehicle (e.g., motor driven power steering (MDPS) system).

As described above, the autonomous driving integrated controller 600 in this embodiment may obtain driving information based on the operations of the operation of the occupant and travelling information indicating the driving state of the autonomous vehicle through the driving information input interface 101 and the travelling information input interface 201, respectively. The autonomous driving integrated controller 600 may transmit driving state information and warning information, generated according to the autonomous driving algorithm, to the output unit 300 through the occupant output interface 301. Additionally, the autonomous driving integrated controller 600 may transmit control information, generated according to the autonomous driving algorithm, to the lower control system 400 through the autonomous vehicle control output interface 401 to enable the driving control of the autonomous vehicle.

To ensure stable autonomous driving of the autonomous vehicle, it is necessary to continuously monitor the driving state of the autonomous vehicle by accurately measuring the driving environment of the autonomous vehicle and control driving based on the measured driving environment. To this end, as illustrated in FIG. 1, an autonomous driving apparatus in this embodiment may include a sensing module 500 for detecting surrounding objects of the autonomous vehicle, such as other vehicles, pedestrians, roads, or fixed structures (e.g., traffic lights, signposts, traffic signs, construction fences, etc.).

The sensing module 500, as shown in FIG. 1, may include one or more of a light detection and ranging (LiDAR) sensor 510, a radar sensor 520, and a camera sensor 530 to detect surrounding objects outside the autonomous vehicle.

The LiDAR sensor 510 may detect a surrounding object outside the autonomous vehicle by transmitting a laser signal around the autonomous vehicle and receiving the signal reflected back from the object. The LiDAR sensor 510 may detect the surrounding object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the autonomous vehicle, respectively, but the installation location of each LiDAR sensor and the number of LiDAR sensors are not limited to a specific embodiment. A threshold for determining the validity of a laser signal reflected and returning from an object may be previously stored in a memory (not illustrated) of the autonomous driving integrated controller 600. The autonomous driving integrated controller 600 may determine the position (including the distance to the object), speed, and direction of movement of the object by measuring the time taken for the laser signal transmitted by the LiDAR sensor 510 to be reflected back from the object.

The radar sensor 520 may detect a surrounding object outside the autonomous vehicle by emitting an electromagnetic wave around the autonomous vehicle and receiving the signal reflected back from the object. The radar sensor 520 may detect the surrounding object located within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the autonomous vehicle, respectively, but the installation location of each radar sensor and the number of radar sensors are not limited to a specific embodiment. The autonomous driving integrated controller 600 may determine the position (including the distance to the object), speed, and direction of movement of the object by analyzing the power of an electromagnetic wave transmitted and received by the radar sensor 520.

The camera sensor 530 may detect a surrounding object outside the autonomous vehicle by capturing an image of the area around the vehicle. The camera sensor 530 may detect the surrounding object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the autonomous vehicle, respectively, but the installation location of each camera sensor and the number of camera sensors are not limited to a specific embodiment. The autonomous driving integrated controller 600 may determine a location (including a distance to a corresponding object), speed, and moving direction of the corresponding object by applying predefined image processing to an image captured by the camera sensor 530. The autonomous driving integrated controller 600 may determine the position (including the distance to the object), speed, and direction of movement of the object by applying a predefined image processing algorithm to the image captured by the camera sensor 530.

In addition, an internal camera sensor 535 for capturing the inside of the autonomous vehicle may be mounted at a predetermined location (e.g., rearview mirror) inside the vehicle. The autonomous driving integrated controller 600 may monitor the behavior and state of the occupant based on an image captured by the internal camera sensor 535 and provide guidance or warnings to the occupant through the output unit 300.

In addition to the LiDAR sensor 510, radar sensor 520, and camera sensor 530, the sensing module 500 may also include an ultrasonic sensor 540 as shown in FIG. 1. Further, various types of sensors for detecting surrounding objects of the autonomous vehicle may be further employed in the sensing module 500.

For better understanding of this embodiment, FIG. 2 illustrates an example where the front LiDAR sensor 511 or front radar sensor 521 is installed at the front of the autonomous vehicle, the rear LiDAR sensor 513 or rear radar sensor 524 is installed at the rear of the autonomous vehicle, and the front camera sensor 531, left camera sensor 532, right camera sensor 533, and rear camera sensor 534 are installed at the front, left, right, and rear of the autonomous vehicle, respectively. However, as described above, the installation position of each sensor and the number of sensors are not limited to a specific embodiment.

To assess the condition of the occupant in the autonomous vehicle, the sensing module 500 may also include a biometric sensor to detect biological signals of the occupant (e.g., heart rate, electrocardiogram, respiration, blood pressure, body temperature, brain waves, blood flow (pulse wave), and blood sugar). The biometric sensors may include a heart rate sensor, electrocardiogram sensor, respiration sensor, blood pressure sensor, body temperature sensor, electroencephalogram sensor, photoplethysmography sensor, and blood sugar sensor.

The sensing module 500 additionally includes a microphone 550. In particular, an internal microphone 551 and an external microphone 552 may be used for different purposes, respectively.

The internal microphone 551 may be used, for example, to analyze the voice of the occupant in the autonomous vehicle 1000 based on artificial intelligence (AI) or to respond immediately to direct voice commands.

On the other hand, the external microphone 552 may be used, for example, to appropriately respond to safe driving by analyzing various sounds generated from the outside of the autonomous driving vehicle 1000 based on various analysis tools such as deep learning.

For reference, the symbols illustrated in FIG. 2 may perform the same or similar functions as those illustrated in FIG. 1. FIG. 2 illustrates a relative positional relationship of each component (based on the interior of the autonomous driving vehicle 1000) in more detail compared to FIG. 1.

Figure 3:
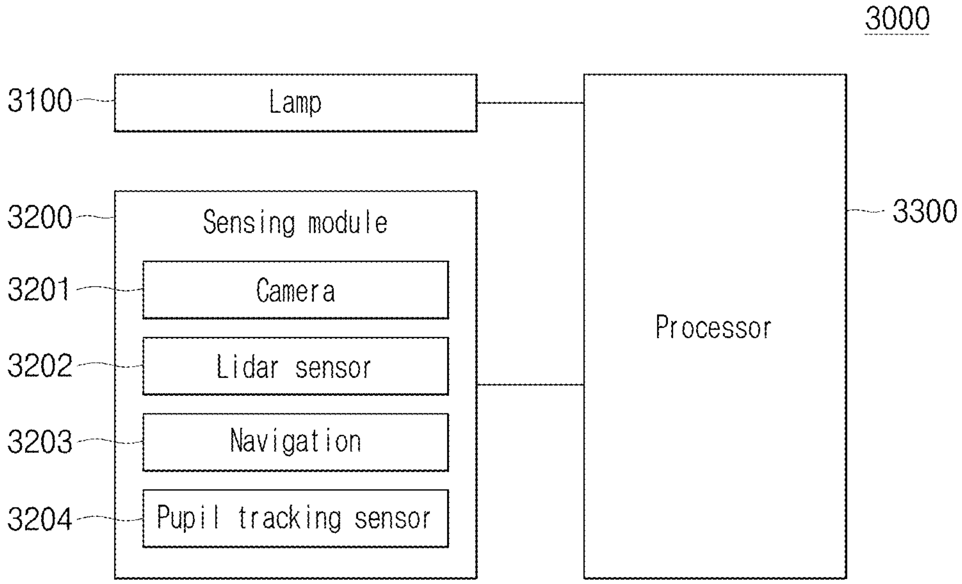
FIG. 3 illustrates a lamp control system according to embodiments.

FIG. 3 illustrates a lamp control system according to embodiments.

A sensing module 3200 shown in FIG. 3 may correspond to the sensing module 500 shown in FIG. 1. A processor 3300 shown in FIG. 3 may correspond to the autonomous driving integrated controller 600 shown in FIG. 1.

Referring to FIG. 3, a lamp control system 3000 according to embodiments may include lamps 3100, the sensing module 3200, and the processor 3300.

The lamps 3100 are a type of output unit that emits light in the forward direction of the vehicle, which may be made in pairs. More specifically, the lamps 3100 may be a type of headlamp that is configured as a pair on the left front and right front of the vehicle. In general, headlamps or headlights may include low beams, high beams, turn signals, daytime running lights, and position lights. The lamps 3100, controlled by the processor 3300 of the lamp control system 3000 according to the embodiments, may correspond to the high beams among the low beams, high beams, turn signals, daytime running lights, and position lights.

The sensing module 3200 may sense an adjacent lane of the traveling vehicle to determine a specific lamp (e.g., the left lamp or the right lamp) among the pair of lamps 3100 of which the light output is to be controlled. In other words, the sensing module 3200 may sense the adjacent lane of the traveling vehicle and transmit information on the sensed adjacent lane to the processor 3300. For example, the sensing module 3200 may include a camera 3201 that captures images of the adjacent lane of the traveling vehicle. More specifically, the camera 3201 may capture images of the adjacent lane located in front of the vehicle, and the camera 3201 may correspond to the front camera 531 shown in FIG. 1 and FIG. 2.

Alternatively, the sensing module 3200 may detect static or dynamic objects around the vehicle. In other words, the sensing module 3200 may detect whether there are static or dynamic objects around the vehicle. Upon detecting such objects, the sensing module 3200 may transmit information on the detected objects to the processor 3300. For example, the sensing module 3200 may include the camera 3201 or a LiDAR sensor 3202 for determining the presence of dynamic objects around the vehicle or a navigation system 3203 for determining the presence of static objects. More specifically, the camera 3201 may detect dynamic objects on the right side and in front of the vehicle, and the camera 3201 may correspond to the front camera 531 and/or the right camera 533 in FIG. 1 and FIG. 2. Additionally, the LiDAR sensor 3202 may detect dynamic objects in front of the vehicle, and the LiDAR sensor 3202 may correspond to the front LiDAR sensor 511 in FIG. 1 and FIG. 2.

Alternatively, the sensing module 3200 may detect the pupil movement of the driver. In other words, the sensing module 3200 may detect the pupil movement of the driver to determine whether the driver is looking to the left, right, or forward and transmit information on the gaze direction of the driver to the processor 3300. For example, the sensing module 3200 may include a pupil tracking sensor 3204 that detects the pupil movement of the driver. More specifically, the pupil tracking sensor 3204 may be a type of camera located inside the vehicle (e.g., a camera in the cluster) that detects the pupil movement of the driver, and the pupil tracking sensor 3204 may correspond to the internal camera sensor 535 shown in FIG. 1 and FIG. 2.

The sensing module 3200 and the processor 3300 may be connected to each other via an interface. In other words, the interface may transmit information on the adjacent lane sensed by the sensing module 3200, information on the presence of dynamic or static objects around the vehicle, and/or information on the pupil movement of the driver to the processor 3300.

Additionally, the interface may also transmit the status of the pair of lamps 3100 to the processor 3300.

The processor 3300 may receive the information on the adjacent lane of the traveling vehicle sensed by the sensing module 3200. Based on the received information on the adjacent lane, the processor 3300 may control the light output of the specific lamp (e.g., the left lamp or the right lamp) among the pair of lamps 3100. In other words, the processor 3300 may determine which lamp in the pair of lamps 3100 to control the light output based on the information on the adjacent lane of the traveling vehicle. Therefore, the processor 3300 may control the light output of one of the lamps in the pair of lamps 3100 or the light output of both lamps in the pair of lamps 3100 based on the information on the adjacent lane.

Upon receiving information that the adjacent lane of the traveling vehicle is either the center line or the outermost lane, the processor 3300 may control the light output of a lamp in the pair of lamps 3100 that is adjacent to the corresponding lane. The outermost lane may refer to the leftmost lane. Details thereof will be described later with reference to FIG. 4.

Figure 4:
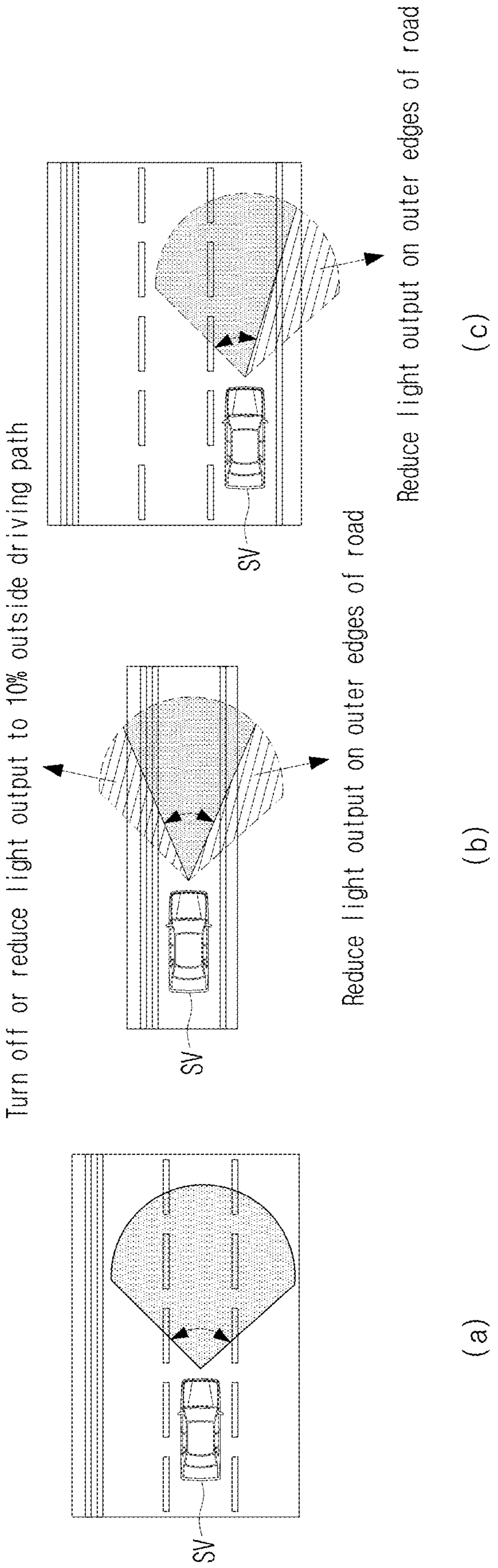
FIG. 4 illustrates lamp control of a vehicle according to embodiments.

FIG. 4 illustrates lamp control of a vehicle according to embodiments.

A subject vehicle (SV) shown in FIG. 4 is equipped with the lamp control system 3000. The lamp control system 3000 may correspond to the lamp control system 3000 in FIG. 3, and the vehicle may correspond to the vehicle in FIG. 1 and FIG. 2.

FIG. 4 is a diagram for explaining how the processor 3300 controls the light output according to the type of adjacent lane of the subject vehicle (hereinafter referred to as 'SV').

First, referring to (a) of FIG. 4, when (or in response to that) the adjacent lane of the SV is neither the center line nor the outermost lane, the processor 3300 may not control the light output of both lamps in the pair of lamps 3100. In other words, in this case, the pair of lamps 3100 may provide 100% of the light output.

For example, when the SV is traveling in the second lane as shown in (a) of FIG. 4, the adjacent lanes of the moving SV correspond to the first lane (left lane) and the second lane (right lane), the processor 3300 may not control the light output of both the left lamp or the right lamp. That is, both the left lamp and the right lamp may provide 100% of the light output.

Referring to (b) of FIG. 4, when the adjacent lanes of the SV correspond to the center line and the outermost lane, the processor 3300 may control the light output of both lamps in the pair of lamps 3100. In other words, in this case, both lamps in the pair 3100 may provide a light output less than 100%.

For example, when the SV is traveling on a single-lane one-way road as shown in (b) of FIG. 4, the adjacent lanes of the traveling SV correspond to the center line (left lane) and the outermost lane (right lane). Therefore, the processor 3300 may control the light output of both the left lamp and the right lamp. That is, both the left lamp and the right lamp may provide a light output less than 100%.

Referring to (c) of FIG. 4, when one of the adjacent lanes of the SV corresponds to the center line or the outermost lane, the processor 3300 may control the light output of a lamp in the pair of lamps 3100 that is adjacent to the center line or the outermost lane. In other words, in this case, the lamp in the pair of lamps 3100 that is adjacent to the center line or the outermost lane may provide a light output less than 100%, while the other lamp may provide 100% of the light output.

For example, when the SV is traveling in the outermost lane, i.e., third lane on a three-lane one-way road as shown in (c) of FIG. 4, the adjacent lanes of the traveling SV correspond to the second lane (left lane) and the outermost lane (right lane), the processor 3300 may control the light output of the right lamp. That is, the left lamp may provide 100% of the light output, but the right lamp may provide a light output less than 100%.

Therefore, when the adjacent lane of the traveling vehicle corresponds to the center line or the outermost lane, the lamp control system 3000 according to the embodiments may control the light output of a lamp adjacent to the lane.

When the adjacent lane of the traveling vehicle corresponds to the center line, the processor 3300 may completely turn off the light output of the lamp adjacent to the center line or control the light output of the lamp adjacent to the center line to have a first light output. In this case, the first light output may be 10%.

More specifically, the processor 3300 may completely turn off the light output of the left-side portion of a beam pattern provided by the lamp adjacent to the center line or control the light output of the left-side portion to have the first light output. In other words, the processor 3300 may control the light output of the lamp adjacent to the center line (left lamp) for a range that crosses the center line (opposite lane range or left range), while the processor 3300 may not control the light output for a range that does not cross the center line (driving lane range or right range).

That is, since the left side of the road based on the center line is an opposite lane, the lamp control system 3000 according to the embodiments may preserve the visibility of drivers in oncoming vehicles by completely turning off the light output or providing a lower light output for the range that crosses the center line.

When the adjacent lane of the traveling vehicle corresponds to the outermost lane, the processor 3300 may control the light output of a lamp adjacent to the outermost lane to have a second light output. In this case, the second light output may have a value greater than the first light output. For example, if the first light output is 10%, the second light output may be less than 100% but greater than 10%.

More specifically, the processor 3300 may control the light output of the right-side portion of a beam pattern provided by the lamp adjacent to the outermost lane to have the second light output.

In other words, since the right side of the road based on the outermost lane is a pedestrian road, the lamp control system 3000 according to the embodiments reduces the light output for the range that crosses the outermost lane to prevent glare for pedestrians outside the lane, while simultaneously providing a certain level of light output to alert pedestrians to the presence of the vehicle.

As described in FIG. 3, the processor 3300 may receive information on the adjacent lane of the traveling vehicle sensed by the sensing module 3200. That is, if the adjacent lane is the center line or the outermost lane, the processor 3300 may control the light output of a lamp adjacent to the corresponding lane based on the received information on the adjacent lane.

The information on the adjacent lane may include information on the number of lanes, information on the types of lanes, and information on the colors of lanes. That is, the processor 3300 may determine the road on which the vehicle is currently driving and/or the position of the vehicle based on the information on the number of lanes, the information on the types of lanes, the information on the colors of lanes, and/or combination thereof.

For example, if there are four lanes (three-lane road), a logic for determining determine which lane is the adjacent lane of the traveling vehicle based on information on the adjacent lane will be explained.

First, the sensing module 3200 may sense information on the left adjacent lane of the pair of adjacent lanes of the traveling vehicle and transmit the information to the processor 3300. The processor 3300 may determine which lane the adjacent lane corresponds to, based on the information on the adjacent lane.

For example, if the left adjacent lane is a double solid line and there is a barrier to the left of the left adjacent lane, the processor 3300 may determine that the left adjacent lane corresponds to the center line. Alternatively, if the left adjacent lane is a dashed line and there is a double solid line to the left of the left adjacent lane, the processor 3300 may determine that the left adjacent lane is the second lane, which does not correspond to the center line. Alternatively, if the left adjacent lane is a dashed line and there is another dashed line to the left of the left adjacent lane, the processor 3300 may determine that the left adjacent lane is the third lane, which does not correspond to the center line.

Similarly, for example, if the right adjacent lane is a solid line and there is a barrier to the right of the right adjacent lane, the processor 3300 may determine that the right adjacent lane corresponds to the outermost lane (the fourth lane in the case of a three-lane road). Alternatively, if the right adjacent lane is a dashed line and there is a solid line to the right of the right adjacent lane, the processor 3300 may determine that the right adjacent lane does not correspond to the outermost lane. Alternatively, if the right adjacent lane is a dashed line and there is another dashed line to the right of the right adjacent lane, the processor 3300 may determine that the right adjacent lane does not correspond to the outermost lane.

The determination logic based on the type and number of lanes has been explained, but lanes may also be determined by combining lane color information such as white, yellow, and blue.

Figure 6:
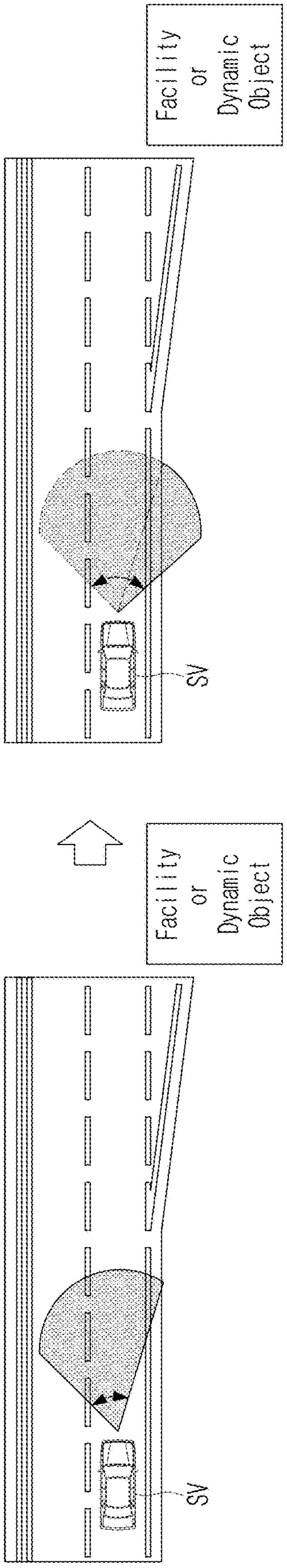
Figure 7:
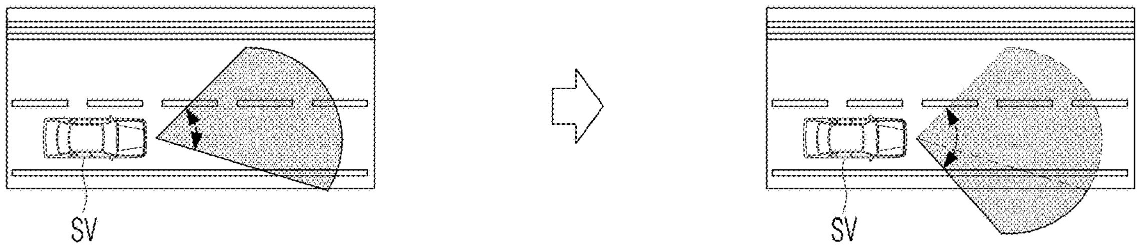

FIGS. 5 to 7 illustrate lamp control of a vehicle according to additional embodiments.

An SV shown in FIGS. 5 to 7 is equipped with the lamp control system 3000. The lamp control system 3000 may correspond to the lamp control system 3000 in FIG. 3, and the vehicle may correspond to the vehicle in FIGS. 1 and 2.

Hereinafter, various embodiments of the lamp control system 3000 according to the embodiments will be described with reference to FIGS. 5 to 7.

First, referring to FIG. 5, the processor 3300 may analyze the driving tendency or tendencies of the driver. When controlling the light output of a lamp adjacent to the outermost lane, the processor 3300 may adjust the degree of control of the light output for each driver based on the analyzed driving tendency or tendencies. The analyzed driving tendency or tendencies of the driver may be stored in the memory described in FIGS. 1 and 2.

That is, compared to a case where the adjacent lane is the center line, when the adjacent lane is the outermost lane, the processor 3300 may require a certain level of light output to notify pedestrians of the presence of the vehicle and control the required light output differently according to the tendency or tendencies of the driver.

For example, as shown in FIG. 5, the driving tendency or tendencies of the driver may be categorized as follows: cautious, average, and safety-conscious, based on an acceleration tendency or tendencies, a safe distance tendency or tendencies, a reaction speed tendency or tendencies, and/or combination thereof. The processor 3300 may control the light output of the lamp adjacent to the outermost lane according to the categorized driving tendency or tendencies as follows: For a cautious driver, the processor 3300 may set the light output to 70%. For an average driver, the processor 3300 may set the light output to 50%. For a safety-conscious driver, the processor 3300 may set the light output to 30%.

For example, if the driver is categorized as cautious, it may mean that the driver has a strong tendency to accelerate, maintains a short safe distance from the vehicle ahead, and has a slow reaction time to surrounding situations. Therefore, in this case, there is a greater need to notify pedestrians of the presence of the vehicle, and thus, the processor 3300 may control the light output of the lamp to have a relatively high value. For instance, the light output may be controlled to 70%.

Alternatively, if the driver is categorized as average, it may mean that the driver has a moderate tendency to accelerate, maintains a moderate safe distance from the vehicle ahead, and has a moderate reaction time to surrounding situations. Therefore, in this case, the need to notify pedestrians of the presence of the vehicle is less than for cautious drivers, and thus the processor 3300 may control the light output of the lamp to have a lower value than for cautious drivers. For instance, the light output may be controlled to 50%.

Alternatively, if the driver is categorized as safety-conscious, it may mean that the driver has a low tendency to accelerate, maintains a long safe distance from the vehicle ahead, and has a quick reaction time to surrounding situations. Therefore, in this case, the need to notify pedestrians of the presence of the vehicle is lower (the driver is more likely to be aware of the presence of the pedestrians), and thus the processor 3300 may control the light output of the lamp to have a relatively low value. For instance, the light output may be controlled to 30%.

Therefore, the lamp control system 3000 according to the embodiments may efficiently control lamps based on the tendency or tendencies of drivers.

Alternatively, referring to FIG. 6, when a dynamic object such as a moving object or a static object such as a facility is detected in the right front of the outermost lane, the processor 3300 may restore the light output of a lamp adjacent to the outermost lane for a certain period. The dynamic object may be a pedestrian or an animal, while the static object may be a highway facility such as a junction, rest area, or gas station.

That is, as described in FIGS. 3 to 5, when the adjacent lane corresponds to the outermost lane, the processor 3300 may control the light output of the lamp adjacent to the outermost lane to be less than 100%. In this case, if a moving object or a static object such as a facility is detected in the right front of the outermost lane, the processor 3300 may control the light output of the lamp adjacent to the outermost lane to be 100% for a certain period.

The processor 3300 may receive information on static objects such as facilities or dynamic objects around the vehicle detected by the sensing module 3200. Referring also to FIG. 3, for example, the camera 3201 and the LiDAR sensor 3202 may detect if there is a moving object in the right front of the outermost lane, and the navigation system 3203 may transmit information on the presence of facilities or other objects in the right front of the outermost lane to the processor 3300.

That is, when the left adjacent lane of the vehicle is the outermost lane, in other words, when the vehicle is driving in the outermost lane, if a facility or moving object is detected in the right front of the outermost lane, the processor 3300 may restore the light output of the lamp adjacent to the outermost lane to the original level. Therefore, when the facility or moving object is detected in the right front of the outermost lane, the lamp control system 3000 according to the embodiments may provide sufficient light to the area of interest of the driver by restoring the light output of the lamp adjacent to the outermost lane to the original level.

Additionally, the processor 3300 may analyze the reaction speed tendency or tendencies of the driver, configure operating conditions based on the reaction speed tendency or tendencies of the driver, and configure a recovery point based on the configured operating conditions, thereby controlling to restore the light output of the lamp adjacent to the outermost lane at the recovery point when the operating conditions are satisfied for each driver. The analyzed reaction speed tendency or tendencies of the driver may also be stored in the memory described in FIGS. 1 and 2.

That is, when the facility or moving object is detected in the right front of the outermost lane, the processor 3300 may restore the light output of the lamp adjacent to the outermost lane and configure different conditions for restoring the light output based on the reaction speed of the driver.

For example, as shown in FIG. 6, the reaction speed tendency or tendencies of the driver may be categorized as follows: strong, normal, or weak. The processor 3300 may configure different operating conditions for each driver based on the categorized reaction speed tendency or tendencies. For a driver with strong reaction tendency or tendencies, the processor 3300 may restore the light output under the condition that the vehicle is traveling at 80 km/h or less. For a driver with normal reaction tendency or tendencies, the processor 3300 may restore the light output under the condition that the vehicle is traveling at 70 km/h or less. For a driver with weak reaction tendency or tendencies, the processor 3300 may restore the light output under the condition that the vehicle is traveling at 65 km/h or less. These operating conditions may be adjusted according to the speed limits of a road.

For example, if the reaction speed of the driver is categorized as strong, it may mean that the driver has a relatively fast reaction time. Therefore, in this case, even if the speed of the vehicle is relatively high, the driver may detect a facility or dynamic object in the right front of the outermost lane. Thus, the processor 3300 may set the operating condition to a relatively high value. For example, the operating condition may be set to a vehicle speed of 80 km/h or less. When the operating condition is set to 80 km/h or less, the processor 3300 may restore the light output of the lamp to the original level at a point 300 meters before the detected facility or dynamic object.

Alternatively, if the reaction speed of the driver is categorized as normal, it may mean that the driver has an average reaction time. Therefore, in this case, the speed of the vehicle needs to be lower than that for a driver with a strong reaction speed to allow the driver to detect a facility or dynamic object in the right front of the outermost lane. Thus, the processor 3300 may set the operating condition to a relatively lower value. For instance, the operating condition may be set to a vehicle speed of 70 km/h or less, which is lower than that for a driver with a strong reaction speed. When the operating condition is set to 70 km/h or less, the processor 3300 may restore the light output of the lamp to the original level at a point 400 meters before the detected facility or dynamic object.

Alternatively, if the reaction speed of the driver is categorized as weak, it may mean that the driver has a relatively slow reaction time. Therefore, in this case, the speed of the vehicle needs to be relatively lower to allow the driver to detect a facility or dynamic object in the right front of the outermost lane. Thus, the processor 3300 may set the operating condition to a relatively low value. For instance, the operating condition may be set to a vehicle speed of 65 km/h or less. When the operating condition is set to 65 km/h or less, the processor 3300 may restore the light output of the lamp to the original level at a point 450 meters before the detected facility or dynamic object.

Therefore, the lamp control system 3000 according to the embodiments may efficiently control lamps based on the reaction speed tendency or tendencies of drivers.

Alternatively, referring to FIG. 7, the processor 3300 may analyze the pupil movement of the driver. When controlling the light output of a lamp adjacent to the outermost lane, the processor 3300 may restore the light output of the lamp adjacent to the outermost lane for a certain period based on information on the analyzed pupil movement of the driver. In this case, the recovery duration may be one minute. The information on the pupil movement may correspond to information on the time at which the pupils of the driver are focused on the outermost lane and/or information on the number of times the pupils of the driver are focused on the outermost lane.

That is, as described in FIGS. 3 to 5, when the adjacent lane corresponds to the outermost lane, the processor 3300 may control the light output of the lamp adjacent to the outermost lane to be less than 100%. In this case, if it is determined that the driver is focusing on the outermost lane, the processor 3300 may control the light output of the lamp adjacent to the outermost lane to be 100% for a certain period.

The processor 3300 may receive the information on the pupil movement of the driver detected by the sensing module 3200. Referring also to FIG. 3, for example, the pupil tracking sensor 3204 such as a camera located inside the vehicle (e.g., camera in the cluster) may detect the pupil movement of the driver. The information on the detected pupil movement may be transmitted to the processor 3300.

That is, when the left adjacent lane of the vehicle is the outermost lane, that is, when the vehicle is driving in the outermost lane, if it is determined that the gaze of the driver remains on the outermost lane or the driver frequently focuses on the outermost lane within a specific period, the processor 3300 may restore the light output of the lamp adjacent to the outermost lane to the original level. Therefore, when the driver is focusing on the outermost lane, the lamp control system 3000 according to the embodiments may provide sufficient light to the area of interest of the driver by restoring the light output of the lamp adjacent to the outermost lane to the original level.

The processor 3300 may analyze the reaction speed tendency or tendencies of the driver and configure operating conditions based on the reaction speed tendency or tendencies. Then, if the operating conditions are satisfied for each driver, the processor 3300 may control to restore the light output of the lamp adjacent to the outermost lane. The analyzed reaction speed tendency or tendencies of the driver may also be stored in the memory described in FIGS. 1 and 2.

In other words, when the driver is focusing on the outermost lane, the processor 3300 may restore the light output of the lamp adjacent to the outermost lane. The conditions for restoring the light output may be set differently based on the reaction speed of the driver.

For example, as shown in FIG. 7, the reaction speed tendency or tendencies of the driver may be categorized as strong, normal, or weak. The processor 3300 may configure different operating conditions based on the categorized reaction speed tendency or tendencies. The processor 3300 may configure different operating conditions for each driver based on the categorized reaction speed tendency or tendencies. For a driver with strong reaction tendency or tendencies, the processor 3300 may restore the light output under the condition that the driver focuses on the outermost lane for at least 0.2 seconds and/or focuses on the outermost lane at least three times within the specific period. For a driver with a normal reaction tendency or tendencies, the processor 3300 may restore the light output under the condition that the driver focuses on the outermost lane for at least 0.4 seconds and/or focuses on the outermost lane at least two times within the specific period. For a driver with a weak reaction tendency or tendencies, the processor 3300 may restore the light output under the condition that the driver focuses on the outermost lane for at least 0.5 seconds and/or focuses on the outermost lane at least two times within the specific period.

For example, if the reaction speed of the driver is categorized as strong, it may mean that the driver has a relatively fast reaction time. Therefore, in this case, since the gaze of the driver remains on the outermost lane for a relatively short duration or the frequency that the driver focusing on the outermost lane within the specific period is relatively high, the processor 3300 may set the operating condition to a relatively small value for the duration of the gaze or a relatively large value for the frequency of focusing. For instance, the operating condition may be configured such that the gaze of the driver remains on the outermost lane for at least 0.2 seconds or the driver focuses on the outermost lane at least three times within the specific period.

Alternatively, if the reaction speed of the driver is categorized as normal, it may mean that the driver has an average reaction time. Therefore, in this case, since the gaze of the driver remains on the outermost lane for a relatively longer duration than a driver with a strong reaction speed or the frequency of focusing on the outermost lane within the specific period is relatively lower than a driver with a strong reaction speed, the processor 3300 may set the operating condition with a larger value for the duration of the gaze or a smaller value for the frequency of focusing compared to a driver with a strong reaction speed. For example, the operating condition may be configured such that the gaze of the driver remains on the outermost lane for at least 0.4 seconds or the driver focuses on the outermost lane at least two times within the specific period.

Alternatively, if the reaction speed of the driver is categorized as weak, it may mean that the driver has a relatively slow reaction time. Therefore, in this case, since the gaze of the driver remains on the outermost lane for a relatively long duration or the frequency of focusing on the outermost lane within the specific period is relatively low, the processor 3300 may configure the operating condition with a larger value for the duration of the gaze or a smaller value for the frequency of focusing. For instance, the operating condition may be configured such that the gaze of the driver remains on the outermost lane for at least 0.5 seconds or the driver focuses on the outermost lane at least two times within the specific period.

Therefore, the lamp control system 3000 according to the embodiments may efficiently control lamps based on the reaction speed tendency or tendencies of drivers.

Figure 8:
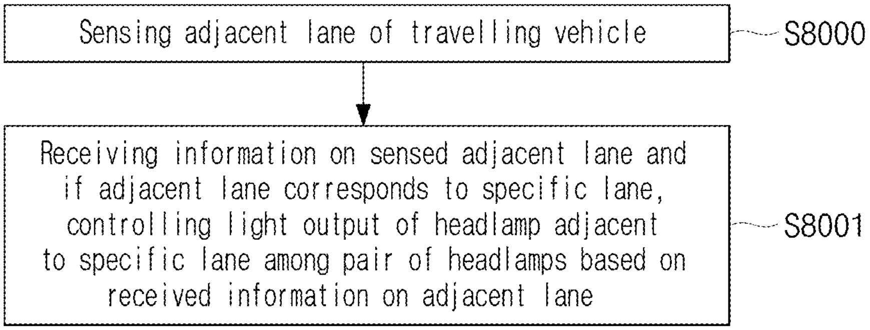
FIG. 8 illustrates a lamp control method according to embodiments.

FIG. 8 illustrates a lamp control method according to embodiments.

Specifically, FIG. 8 shows the method of controlling lamps by the lamp control system 3000 in FIG. 3 of the vehicle in FIGS. 1 and 2 based on the autonomous driving integrated controller 600 in FIGS. 1 and 2 and the processor 3300 in FIG. 3.

Referring to FIG. 8, the lamp control method according to the embodiments may include: sensing adjacent lane of a travelling vehicle (S8000); and receiving information on the sensed adjacent lane and if the adjacent lane corresponds to a specific lane, controlling the light output of a headlamp adjacent to the specific lane among a pair of headlamps based on the received information on the adjacent lane (S8001). The specific lane may be a center line or an outermost lane.

The sensing step (S8000) may be performed by the sensing module 3200 of the lamp control system 3000, and the control step (S8001) may be performed by the processor 3300 of the lamp control system 3000.

In the control step (S8001), if the specific lane corresponds to the center line, that is, if the right adjacent lane among adjacent lanes corresponds to the center line, the light output of a lamp adjacent to the center line may be turned off or controlled to have a first light output. In this case, the first light output may be 10%. Alternatively, in the control step (S8001), if the specific lane corresponds to the outermost lane, that is, if the left adjacent lane among the adjacent lanes corresponds to the outermost lane, the light output of a lamp adjacent to the outermost lane may be controlled to have a second light output. In this case, the second light output may be greater than the first light output and less than 100%.

The embodiments have been described from the perspectives of the method and/or apparatus, and the description of the method and apparatus may be mutually complementary and applicable.

While each drawing has been explained separately for the sake of clarity, it is also possible to design new embodiments by combining the embodiments illustrated in each drawing. Designing a computer-readable recording medium having recorded thereon a program for executing the above-described embodiments as needed by an ordinary skilled person falls within the scope of the present disclosure. The device and method according to the embodiments are not be limited to the configurations and methods in the above-described embodiments. Instead, the embodiments may be selectively combined in whole or in part to allow for various modifications. While preferred embodiments of the present disclosure have been illustrated and explained, the present disclosure is not limited to the specific embodiments described above. In addition, those skilled in the art will appreciate that various modifications may be made in the embodiments without departing from the essence of the embodiments claimed in the claims. These variations should not be individually understood apart from the technical concept or perspective of the embodiments.

Various components of the apparatus according to the embodiments may be implemented by hardware, software, firmware, or a combination thereof. Various components of the embodiments may be implemented as a single chip such as a hardware circuit, for example. According to embodiments, the components of the embodiments may be implemented as separate chips. According to embodiments, at least one or more of the components of the apparatus according to the embodiments may include one or more processors capable of executing one or more programs. The one or more programs may perform one or more of the operations/methods according to embodiments or include instructions for performing the same. Executable instructions for performing the methods/operations of the apparatus according to the embodiments may be stored in a non-transitory computer-readable medium (CRM) or other computer program products configured to be executed by the one or more processors. Alternatively, the instructions may be stored in a transitory CRM or other computer program products configured to be executed by the one or more processors. The concept of memory according to embodiments may encompass not only a volatile memory (e.g., random-access memory (RAM)) but also a non-volatile memory, a flash memory, a programmable read-only memory (PROM), and the like. The memory may also be implemented in the form of carrier waves, such as transmission over the Internet. Furthermore, a processor-readable recording medium may be distributed to computer systems connected over a network, where processor-readable code may be stored and executed in a distributed manner.

In this document, "/" and "," are interpreted as "and/or." For example, "A/B" is interpreted as "A and/or B," and "A, B" is interpreted as "A and/or B." In addition, "A/B/C" means "at least one of A, B, and/or C." Similarly, "A, B, C" also means "at least one of A, B, and/or C." Furthermore, "or" is interpreted as "and/or." For example, "A or B" may mean: 1) "A" only, 2) "B" only, or 3) "A and B." In other words, "or" in this document may mean "additionally or alternatively."

Terms such as "first" and "second" may be used to describe various components of the embodiments. However, the various components according to the embodiments should not be limited by the interpretation of these terms. These terms are merely used to distinguish one component from another. For example, a first user input signal and a second user input signal are both user input signals, but unless clearly indicated in context, the first user input signal and second user input signal do not refer to the same user input signals.

The terms used to describe the embodiments are used for the purpose of describing specific embodiments. In other words, the terms are not intended to limit the embodiments. As described in the embodiments and claims, the singular form is intended to encompass the plural unless explicitly specified in context. The "and/or" expression is used to mean all possible combinations of terms. The terms such as "includes" or "comprises" are used to describe the presence of features, numbers, steps, elements, and/or components and does not imply the exclusion of additional features, numbers, steps, elements, and/or components. Condition expressions such as "if" and "when" used to describe embodiments are not limited to optional cases but are intended to be interpreted to mean that when specific conditions are satisfied, related operations or definitions are performed or interpreted.

The operations according to embodiments described in this document may be performed by a transmitting/receiving device, which includes a memory and/or a processor according to embodiments. The memory may store programs for performing/controlling the operations according to the embodiments, and the processor may control various operations described in this document. The processor may also be referred to as a controller. The operations according to the embodiments may be performed by firmware, software, and/or a combination thereof. The firmware, software, and/or combination thereof may be stored in the processor or memory.

On the other hand, the operations according to the embodiments may also be performed by a transmitting device and/or a receiving device according to embodiments. The transmitting/receiving device may include a transceiver for transmitting and receiving media data, a memory for storing instructions (e.g., program code, algorithms, flowcharts, and/or data) for processes according to embodiments, and a processor for controlling the operations of the transmitting/receiving device.

The processor may be referred to as a controller. The processor may correspond to hardware, software, and/or a combination thereof. The operations according to the embodiments may be performed by the processor. Additionally, the processor may be implemented as an encoder/decoder for the operations according to the embodiments.

Hereinabove, the best mode for implementing the embodiments has been described.

As described above, the embodiments may be applied in whole or in part to an autonomous valet driving apparatus and system.

Those skilled in the art may make various modifications or variations to the embodiments without departing from the scope of the present disclosure.

The embodiments may include modifications/variations without departing from the scope of the claims and their equivalents.

What is claimed is:

1. A lamp control system comprising:
- a pair of lamps configured to emit light forward;
- a sensing module configured to sense an adjacent lane of a traveling vehicle; and
- a processor configured to:
  - receive information on the sensed adjacent lane; and
  - in response to the adjacent lane corresponding to a specific lane, control a light output of a lamp adjacent to the specific lane among the pair of lamps based on the received information on the adjacent lane,
- wherein the specific lane includes at least one of a center line and an outermost lane, and
- wherein the processor is configured to:
  - in response to the specific lane corresponding to the center line, turn off a light output of a lamp adjacent to the center line or control the light output of the lamp adjacent to the center line to have a first light output; and
  - in response to the specific lane corresponding to the outermost lane, control a light output of a lamp adjacent to the outermost lane to have a second light output,
  - wherein the first light output has a value smaller than that of the second light output.

2. The lamp control system of claim 1, wherein, in response to the specific lane corresponding to the outermost lane, the processor is configured to:
- analyze a driving tendency of a driver; and
- control a light output of a lamp adjacent to the outermost lane based on the driving tendency of the driver.

3. The lamp control system of claim 2, wherein the processor is configured to analyze the driving tendency of the driver based on at least one of:
- an acceleration tendency of the driver;
- a safe distance tendency of the driver; and
- a reaction speed tendency of the driver.

4. The lamp control system of claim 1, wherein:
- the sensing module is configured to detect at least one of static and dynamic objects around the traveling vehicle, and
- in response to (1) the specific lane corresponding to the outermost lane and (2) information on at least one of static and dynamic objects outside the outermost lane being received, the processor is configured to restore a light output of a lamp adjacent to the outermost lane for a predetermined period of time.

5. The lamp control system of claim 4, wherein the processor is configured to:
- configure an operating condition based on information on a reaction speed tendency of a driver;
- configure a recovery point based on the operating condition; and
- in response to the operating condition being satisfied for the driver, restore the light output of the lamp adjacent to the outermost lane at the recovery point.

6. The lamp control system of claim 1, wherein:
- the sensing module is configured to detect a pupil movement of a driver, and
- in response to the specific lane corresponding to the outermost lane, the processor is configured to:
  - receive information on the detected pupil movement of the driver; and
  - restore a light output of a lamp adjacent to the outermost lane for a predetermined period of time based on the received information on the pupil movement.

7. The lamp control system of claim 6, wherein the processor is configured to:
- configure an operating condition based on information on a reaction speed tendency of a driver; and
- in response to the information on the pupil movement satisfying the operating condition for the driver, restore the light output of the lamp adjacent to the outermost lane.

8. The lamp control system of claim 7, wherein the information on the pupil movement includes at least one of:
- information on a time at which pupils of the driver are focused on the outermost lane; and
- information on a number of times the pupils of the driver are focused on the outermost lane.

9. The lamp control system of claim 1, wherein the information on the adjacent lane includes at least one of a number of lanes, a lane type, and a lane color.

10. The lamp control system of claim 1, wherein:
- the pair of lamps includes a pair of high beams; and
- the processor is configured to control a beam pattern of a high beam adjacent to the specific lane among the pair of high beams.

11. A method for controlling light outputs of a pair of lamps emitting light forward, the method comprising:
- sensing an adjacent lane of a traveling vehicle;
- receiving information on the sensed adjacent lane; and
- in response to the adjacent lane corresponding to a specific lane, controlling a light output of a lamp adjacent to the specific lane among the pair of lamps based on the received information on the adjacent lane,
- wherein the specific lane includes at least one of a center line and an outermost lane, and
- wherein controlling the light output of the lamp adjacent to the specific lane comprises:
- in response to the specific lane corresponding to the center line, turning off a light output of a lamp adjacent to the center line or controlling the light output of the lamp adjacent to the center line to have a first light output; and
- in response to the specific lane corresponding to the outermost lane, controlling a light output of a lamp adjacent to the outermost lane to have a second light output. wherein the first light output has a value smaller than that of the second light output.

12. A vehicle comprising:
- a pair of lamps configured to emit light forward;

a sensing module configured to sense an adjacent lane while traveling; and a processor configured to:

receive information on the sensed adjacent lane; and in response to the adjacent lane corresponding to a specific lane, control a light output of a lamp adjacent to the specific lane among the pair of lamps based on the received information on the adjacent lane, wherein the specific lane includes at least one of a center line and an outermost lane, and wherein the processor is configured to:

in response to the specific lane corresponding to the center line, turn off a light output of a lamp adjacent to the center line or control the light output of the lamp adjacent to the center line to have a first light output; and in response to the specific lane corresponding to the outermost lane, control a light output of a lamp adjacent to the outermost lane to have a second light output, wherein the first light output has a value smaller than that of the second light output.

* * * * *